United States Patent
Romm

(10) Patent No.: US 8,090,016 B2
(45) Date of Patent: Jan. 3, 2012

(54) ACTIVITY NORMALIZATION FOR VIDEO ENCODING

(75) Inventor: Ilya Romm, Bat Yam (IL)

(73) Assignee: Zoran Corporation, Sunnyvale, CA (US)

( * ) Notice: Subject to any disclaimer, the term of this patent is extended or adjusted under 35 U.S.C. 154(b) by 1265 days.

(21) Appl. No.: 11/804,311

(22) Filed: May 17, 2007

(65) Prior Publication Data

US 2008/0285646 A1    Nov. 20, 2008

(51) Int. Cl.
*H04N 11/04*    (2006.01)
*H04N 7/16*    (2006.01)

(52) U.S. Cl. ................ 375/240.03; 725/20
(58) Field of Classification Search .......... 375/240.03; 725/20

See application file for complete search history.

(56) References Cited

U.S. PATENT DOCUMENTS

| | | | |
|---|---|---|---|
| 6,160,846 A | 12/2000 | Chiang et al. | |
| 6,351,226 B1 | 2/2002 | Saunders et al. | |
| 6,463,100 B1 | 10/2002 | Cho et al. | |
| 6,546,050 B2 | 4/2003 | Ramaswamy | |
| 6,831,947 B2 | 12/2004 | Corbera | |
| 2002/0085633 A1 | 7/2002 | Kim et al. | |
| 2005/0180502 A1 | 8/2005 | Puri | |
| 2006/0013481 A1* | 1/2006 | Park et al. | 382/170 |
| 2006/0222078 A1 | 10/2006 | Raveendran | |

OTHER PUBLICATIONS

"Perceptual Bill Allocation for MPEG-2 CBR Video Coding"; Authors: O. Verscheure, et al., TCOM Laboratory, Telecommunicatios Group, Swiss Federal Institute of Technology, Lausanne, Switzerland;, IEEE, Publication No. 0-7803-3258-X, 1996, pp. 117-120.

International Search Report and Written Opinion from corresponding International Application No. PCT/US08/63871.

* cited by examiner

*Primary Examiner* — Aravind Moorthy
(74) *Attorney, Agent, or Firm* — Lando & Anastasi, LLP

(57) ABSTRACT

The invention facilitates the normalization of activity normalization parameters to be used to select the proper quantization value for encoded video data that directly influences the Human Visual System (HVS).

19 Claims, 4 Drawing Sheets

ACTIVITY NORMALIZATION FOR VIDEO ENCODING

FIELD OF THE INVENTION

The present invention relates generally to the field of encoding video data, and more particularly to a methods for using variable activity metrics during the encoding process and for maintaining uniform visual quality of the video data.

BACKGROUND OF THE INVENTION

The Motion Picture Experts Group ("MPEG") has defined a standard bitstream syntax (the MPEG standard) for the coded representation of video. However, the MPEG standard allows for certain flexibility in the design of video encoders which may, for example, optimize performance by adding sophistication and/or make certain compromises between improving image quality and conserving a low bit rate.

One element of the MPEG bit stream syntax is the quantization step size ("Q"). In typical video coding, the quality of the image and the bit rate of the coded video are inversely proportional to Q. A higher quantization factor uses fewer bits to encode the image, however the resulting image quality may suffer as a result. A lower quantization requires more bits to encode a given video scene, and a result produces a higher quality image. In some implementations (e.g., MPEG) the quantization values can differ for individual image blocks within a frame.

Conventional methods for selecting the values of Q include uniform quantization and adaptive quantization. Uniform quantization uses the same (or nearly the same) Q for each block within a frame. As a result, quantization noise and coding artifacts caused by the compression of data are uniformly distributed throughout the frame, regardless of the activity levels within each frame. In contrast, adaptive quantization permits the variation of Q among different sectors or blocks within a frame so that the quantization noise can be distributed among blocks in a frame in a non-uniform manner. The goal of adaptive quantization is to optimize the visual quality of each video scene and from scene to scene, while maintaining a predefined bit rate. For example, since the human eye is less sensitive to quantization noise and coding artifacts in busy or highly textured parts of images, a higher Q may be used for busy regions of the scene. Conversely, for low-textured scenes, a lower Q is used to improve video quality for that particular scene, by the cost of a higher bit rate.

Although the MPEG standard allows for adaptive quantization, particular implementations of adaptive quantization are not prescribed in the MPEG standard. MPEG2 test model 5 ("TM5") is one example of an adaptive quantization technique for improving subjective visual quality according to metrics such as spatial frequency response and visual masking response.

One technique for measuring image quality is to apply aspects of the human visual system ("HVS") to video scenes. For example, human sensitivity to quantization noise and coding artifacts is less in areas of a video scene having very high or very low brightness (contrast sensitivity). In busy image areas (e.g., areas of high texture, large contrast, and/or signal variance), the sensitivity of the HVS to distortion decreases because the quantization noise and coding artifacts are lost in complex patterns. However, in images with low variation, human sensitivity to contrast and distortion increases.

The artifacts that occur when pictures are coded at low bit rates are blockiness, blurriness, ringing, and color bleeding. In moving video scenes, these artifacts show as run-time busyness and as dirty uncovered backgrounds. The local variance of a video signal is often noticeable to the HVS on a very small scale, such as from pixel to pixel or among groups of blocks of pixels (referred to herein as "blocks"). As a result, the quantization step size ("Q") may be calculated for each block or other small subunit of area ("sector") within each video frame. Accordingly, the quantization step size is typically proportional to a measurement of activity within each block or sector.

In Variable Bit Rate (VBR) and Constant Bit Rate (CBR) video encoding it is desirable to maintain the quality of the image throughout the frame and stream even as the activity varies from frame to frame. Because the quality of the image is tightly coupled to the quantization value Q used during encoding, it is therefore desirable to control quantization in a manner that provides uniform video quality. Thus, there is a need for techniques that select encoding parameters based on different activity levels and quality measures. Such techniques may be more suitable in certain implementations, such as increasing or maintaining image quality while allowing for a simplified encoder design, and would allow for an optimal selection of the activity metric used during the encoding process, as it directly effects the Human Visual System (HVS).

SUMMARY OF THE INVENTION

The invention facilitates an optimal selection of an activity metric that can be used to select the proper quantization for a particular frame or component of a frame. More specifically, the invention provides a method and system for calculating a normalized activity value which facilitates adaptation of any activity metric based on a specified quality measure or visualization standard. Further, the invention allows convergence of the average normalized activity value to '1' thus allowing for greater uniformity of video quality during the encoding process independent of the activity in the content. This approach facilitates adaptation to various activity metrics without having to modify the physical design of an encoder, thereby providing flexibility not provided by the conventional TM5 empirical solution. Hence, the invention also provides alternate quantization determination models, metrics and empirically derived parameters based on their effects on certain visualization schemes (e.g., the Human Visualization System, or HVS) that may be incorporated at the block level in video devices of varying complexity and cost.

In a first aspect, a method for calculating a quantization value used during video encoding includes providing a predetermined activity metric for a video sequence, determining a minimum normalized activity value and a maximum normalized activity value for the video sequence, determining a set of normalization activity parameters that are bounded by the minimum normalized activity value and the maximum normalized activity value, using the set of normalization parameters to determine a normalized activity value, from which a quantization step size for the block of video frame can be calculated.

In some embodiments, the quantization value may be determined for the entire sequence, for a sequence of frames, or for one frame. In certain cases, the minimum normalized activity value is greater than 0 and less than 1 and the maximum normalized activity value is greater than one. The normalization activity parameters may, in some instances, assure that the average normalized activity value is equal to 1 for the portion of the video sequence (e.g., frame) regardless of the predetermined activity metric. In specific embodiments, the set of normalization activity parameters includes a first parameter C, a second parameter D, and third parameter m, and the function for determining the normalized activity value for the video sequence adds C to the predetermined activity value for the sequence, and divides the result by the sum of D and the product of m and the predetermined activity value.

In another aspect, a method for encoding a video sequence includes selecting an activity metric, selecting a video quality parameter based on the human visualization system, calculating a normalized activity value (at, for example the frame and/or block level) that optimizes the selected video quality parameter, calculating a quantization step size based on the normalized activity value, and encoding the video sequence using the quantization step size. The normalized activity value may be based, for example, on a predetermined activity metric and a set of normalization activity parameters.

In another aspect, an article of manufacture having a computer-readable medium with the computer-readable instructions embodied thereon performs the methods described in the preceding paragraphs.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
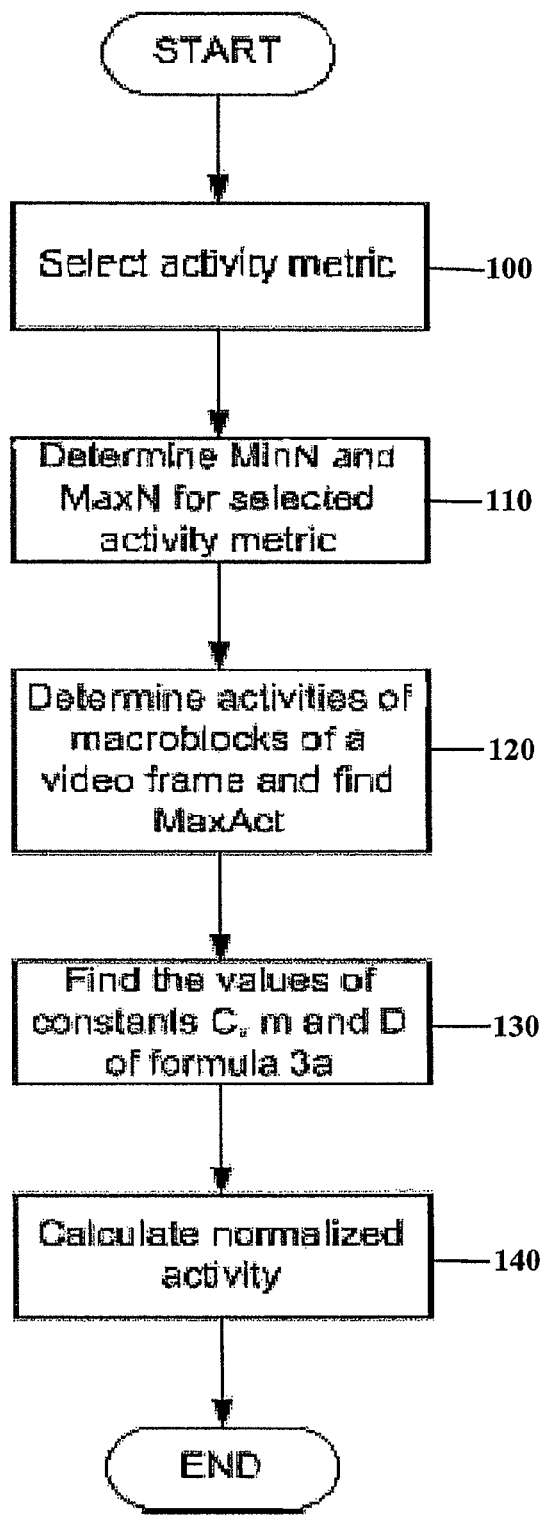
FIG. 1 is a flow chart depicting, at a summary level, the steps for calculating a normalized activity value in accordance with various embodiments of the invention.

According to Test Model 5 (the rate control scheme described in ISO/IEC (MPEG2) "Test Model 5 (TM5), April 1993"), the quantization step size mquant of a block within a video frame is calculated according to equation:

$$mquant_i = Q_i * N_i \quad (1)$$

where $Q_i$ is the base quantization value for block i, and $N_i$ is the normalized activity (or complexity), of block i, which modulates the base quantization value.

The base quantization value is calculated according to the status of the compressed bits buffer and changes slowly, depending on a reaction factor which can be chosen large enough so that the base quantization value Q does not change for a frame comprising numerous blocks. In this case, equation (1) can be written in the form:

$$mquant_i = Q * N_i \quad (2)$$

where Q is the base quantization value attributed to the frame to which block i belongs.

The TM5 equation for calculating a normalized activity for block i is described below:

$$N_i = \frac{2 * act_i + AvgAct}{act_i + 2 * AvgAct} \quad (3)$$

where $act_i$ designates the activity of block i, and is defined as:

$$act_i = 1 + \min(var_i^k)$$

where k is a counter of, for example, four luminance 8×8 blocks of block i, and hence k receives the values k=0 . . . 3, and $$var_i^k = \left( \sum_{j=0}^{63} p_{i,j,k}^2 - \left( \frac{\sum_{j=0}^{63} p_{i,j,k}}{64} \right)^2 \right) / 64$$

where $P_{i,k,j}$ is the luminance of the pixel. AvgAct in equation (3) is the average activity of the frame, and is calculated according equation (4):

$$AvgAct = \frac{\sum_{i=1}^{n} act_i}{n} \quad (4)$$

where n is the number of blocks in the frame.

Therefore, based on equation (2), the average quantization value of a frame according to the TM5 technique is:

$$Q_{Avg} = \frac{\sum_{i=1}^{n} mquant_i}{n}$$

$$= \frac{\sum_{i=1}^{N} Q * N_i}{n}$$

$$= Q \frac{\sum_{i=1}^{n} N_i}{n} = Q * AvgN \quad (5)$$

where AvgN is the average normalized activity, calculated according to the formula:

$$AvgN = \frac{\sum_{i=1}^{n} N_i}{n}. \quad (6)$$

In some cases, detailed below, it is desirable that the average quantization value be equal to the base quantization value, that is:

$$Q_{Avg} = Q \quad (7)$$

This may be desirable in cases where the average quantization value of a frame is held constant at a predefined value, such as when a variable bit rate (VBR) control algorithm is used. In this case it may not be necessary to consider to the compressed bits buffer status during single frame encoding and reach a predefined value of the average quantization value according to equation (7). Equation (7) results from equation (5) when:

$$AvgN = \frac{\sum_{i=1}^{n} N_i}{n} = 1 \qquad (8)$$

Therefore, the normalization formula must adhere to constraint (8), however the normalization formula (3) does not always do so. For example, consider a frame comprised of two blocks with activities 1 and 255 respectively. In this case:

$$AvgN = \frac{(1+255)}{2} = 128$$

and according to equation (3):

$$N_1 = \frac{2*1+128}{1+2*128} = \frac{130}{257} = 0.51, \text{ and}$$

$$N_2 = \frac{2*255+128}{255+2*128} = \frac{638}{511} = 1.25$$

and according to equation (6):

$$AvgN = \frac{(0.51+1.25)}{2} = 0.88,$$

which does not equal 1 as desired.

The TM5 quantization technique of equation (3) does not overcome this problem. Specifically, this example demonstrates that when it is desirable that the average normalized activity AvgN complies with the constraint (8) (in order to achieve the same quality for each frame, for example), formula (3) for normalized activity does not provide an acceptable result.

The invention, therefore, provides an improved method of calculating normalized activity that allows the selection of parameters such that a conversion to an AvgN of '1' occurs, and allows adaptation to other activity metrics, thereby providing flexibility not provided by the conventional TM5 approach. By introducing additional parameters into the calculation of the normalized activity metric N, the invention allows alternate quantization determination schemes, metrics and empirically derived parameters to be incorporated in different complexity and cost devices.

Specifically, this technique facilitates a more rapid convergence to an AvgN of '1' as is most desirable for controlling the average quantization value of a frame so that it is equal to a predefined value. Furthermore, activity metrics other than the one suggested by TM5 may also be used, allowing the use of a simpler activity metric than would be used otherwise, which reduces the calculation complexity without having a negative impact on the HVS.

As a result, the invention provides a better video image quality than conventional techniques because the average quantization value of a given frame is a metric of the ongoing quality of a video scene. The average quantization step size of the frame is a metric of video quality—when the average quantization step size rises the quality become worse and vice versa and in the conventional BRC the average quantization step size is unpredictable. As a result, some frames in the video sequence will be encoded using an average quantization step size that is higher than the optimal value, thus leading to poor quality. Further, some frames will be encoded using a less than optimal average quantization step size, leading to a waste of bits and unnecessary increases in quality for such frames. In contrast, the invention provides a technique for controlling the average quantization step size of the frames or other portion of video, thereby facilitating better control and uniformity of the overall video quality that is not possible using conventional means. Specifically, the method improves upon the TM5 technique that uses formula (3) above by allowing the flexibility needed for calculating the normalized activity value on a block-by-block basis, as is shown below in equation (3a):

$$N_i = \frac{act_i + C}{m*act_i + D}, \qquad (3a)$$

where C, D and m are constants, the values of which are to be found as explained below.

According to the notation used herein, the minimum possible value of the block activity within a frame is MinAct, the maximum possible value of the block activity within a frame is MaxAct, the minimum desirable normalized activity is MinN and maximum desirable normalized activity is MaxN. It may also be assumed that MinAct=0 and the values of MinN and MaxN are limited by the conditions:

0<MinN<1, and

MaxN>1.

Choosing values of MinN=0.5 and MaxN=2 result in the special case of equation (3). Generally, MinN and MaxN are used to adjust activity metric for a particular HVS model.

FIG. 1 illustrates, at a summary level, principle steps for determining a normalized activity of a given block within a video frame. Initially, an activity metric is selected from among a plurality of possible activity metrics relevant to the specific implementation resources available for the task and desired results (STEP 100). The values for MinN and MaxN are then determined for the selected activity metric (STEP 110), as further explained in more detail below. The activity level of each block within a video frame is determined, from which the MaxAct can be determined (STEP 120). Based on the determinations of MinN, MaxN and MaxAct and as further described in more detail below, the values for C, m, and D of equation (3a) are determined (STEP 130). The normalized activity of the block can then be determined according to equation (3a) (STEP 140). The invention enables, therefore, the use of a chosen activity metric to result in a calculated normalized activity.

This invention addresses two shortcomings of the conventional techniques. Specifically, the frames in a given video sequence may suffer from non-uniform quality, even using a constant base quantizer, because the average quantization step size of the frame is unpredictable as there is not guarantee that the average normalized activity of the frame will remain consistent. Second, the lack of tools to adjust the activity metric to a chosen HVS.

In one embodiment, equation (3a) complies with constraint (8) and three additional constraints (9), (10), and (11) below:

If $act_i$=MinAct, then $N_i$=MinN, (9)

If $act_i$=MaxAct, then $N_i$=MaxN. (10)

Normalized activity N as a function of activity (act) increases monotonically between MinAct and MaxAct. This condition means that the differential of N with respect to act remains positive between activities values MinAct and MaxAct. In other words, the differential of N from equation (3a) with respect to act is positive as follows:

$$N'_{act} = \left(\frac{act+C}{m*act+D}\right)' = \frac{D-m*C}{(m*act+D)^2} > 0. \quad (11)$$

Inasmuch as MinAct=0, then, using (3a), constraints (9) and (10) can be formulated as:

$$\frac{MinAct+C}{m*MinAct+D} = \frac{C}{D} = MinN, \text{ and} \quad (12)$$

$$\frac{MaxAct+C}{m*MaxAct+D} = MaxN. \quad (13)$$

Having four equations, i.e., equations (3a), (8), (12) and (13), and four variables, i.e., variables C, D, m and Ni, it is possible to find the values for each. The analytic solution is very complex, having a degree N, because of equation (8). Therefore, the solution must be numerical. Expressing variables C and m through D it can be shown that from equation (12) the following is found:

$$C = MinN*D \quad (14)$$

and from (13) and (14) the following:

$$m = \frac{MaxAct + D*MinN - D*MaxN}{MaxAct*MaxN} \quad (15)$$

Given expressions (14) and (15) for C and m, condition (11) holds true when D>0. Replacing $N_i$ in equation (8) with the right side of equation (3a) and replacing C and m in equation (3a) with the right sides of (14) and (15), equation (16) results in:

$$\frac{\sum_{i=1}^{N} N_i}{N} = \frac{\sum_{i=1}^{N} \frac{act_i + C}{m*act_i + D}}{N} \quad (16)$$

$$= \frac{\sum_{i=1}^{N} \frac{act_i + MinN*D}{\frac{MaxAct + D*MinN - D*MaxN}{MaxAct*MaxN}*act_i + D}}{N}$$

$$= 1$$

which can be numerically solved for D using a few iterations.

Once activities of all blocks of a frame are calculated, the value of D can be found from equation (16). The values of C and m may then be calculated using equations (14) and (15) and C, D and m can be used in equation (3a) to determine the normalized activity. It should be further understood that equation (3a) can be used when C and m are expressed through D as shown in equation (3b):

$$N_i = \frac{MaxAct*MaxN*(act_i + MinN*D)}{act_i*(MaxAct + D*MinN - D*MaxN) + MaxAct*MaxN*D}. \quad (3b)$$

$N_i$, as a function of D, is monotonic and not increasing. This can be proven by differentiating $N_i$ with respect to D. Using equation (3b) it is found that:

$$N'_i = \frac{MaxAct*MaxN*act_i* (MaxAct - act_i)*(MinN - MaxN)}{(act_i*(MaxAct + D*MinN - D*MaxN) + MaxAct*MaxN*D)^2} \quad (17)$$

The denominator of equation (17) is always positive, while the numerator may be either zero (when $act_i$=MaxAct) or negative otherwise. Therefore, $N_i$ is a monotonic, non-increasing function of D. Hence, equation (16) can be numerically solved using a binary search with few iterations.

Figure 2:
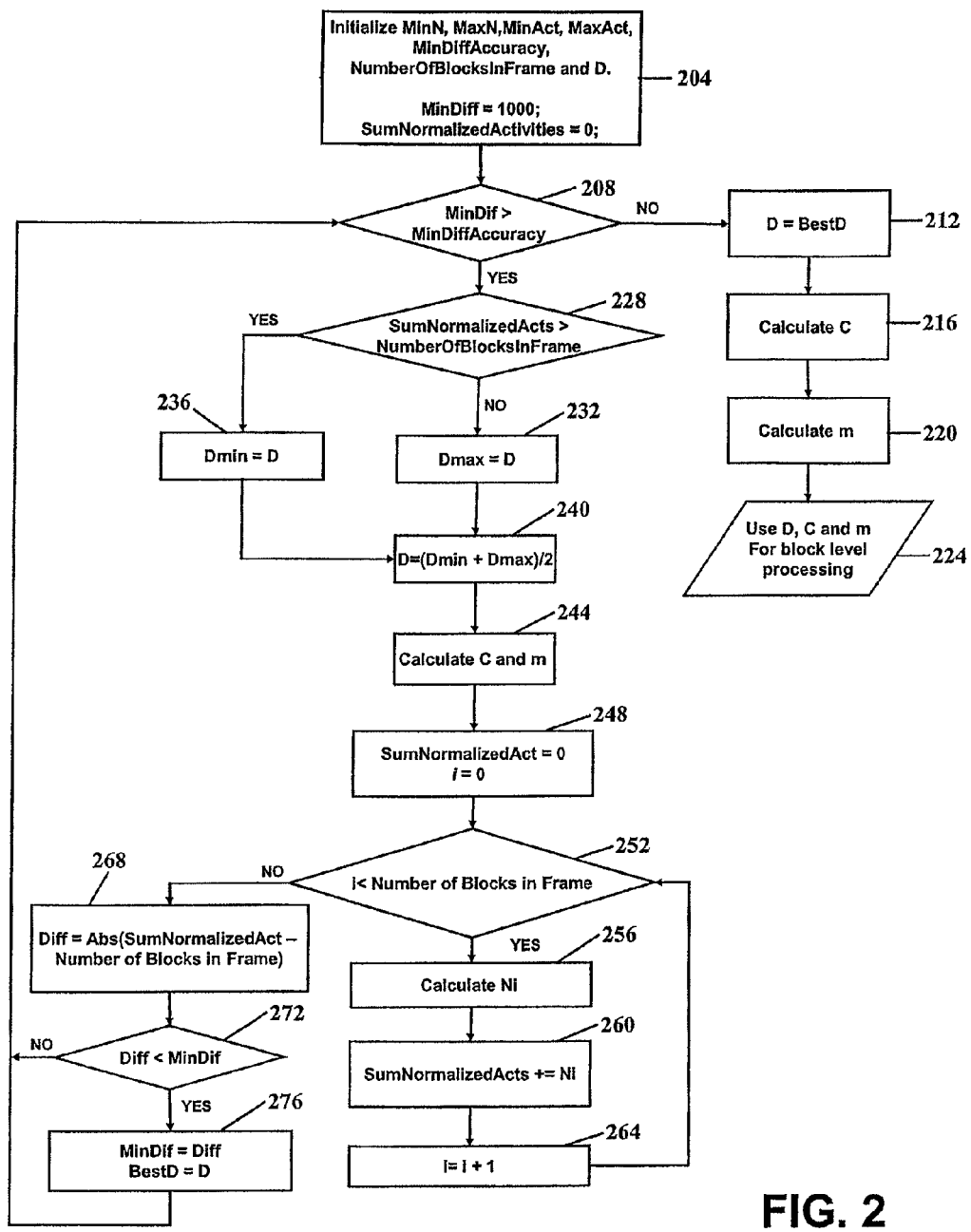
FIG. 2 is a flow chart depicting the steps for calculating a normalized activity value for a block within a frame in accordance with various embodiments of the invention.

FIG. 2 illustrates, in flowchart form, the method for determining the values of C, D, and m at the marcoblock level, which can then be used to encode the entire frame with single-frame convergence. First, various parameters are initialized (STEP 204). In particular, MinN (the minimum normalized activity for the block), MaxN (the maximum normalized activity for the block), MinAct (the minimum activity for the block), MaxAct (the minimum activity for the block), MinDiff (the minimum difference between the sum of block's normalized activities and number of blocks in a frame), MinDiffAccuracy (the accuracy of the difference between the sum of block's normalized activities and number of blocks in a frame), Dmin (the minimum possible value for the constant D, or 0), Dinit (the initial value for the constant D, such as 250 in certain cases) and SumNormalizedActivities (the sum of the normalized activity for the block). If MinDiff for the block is not greater than MinDiffAccuracy, (STEP 208) the initial value of D is used as the BestD (STEP 212). Using equations (14) and (15) above, C and m can be calculated (STEPS 216 and 220), and those values can then be used in equation (3a) to determine the normalized activity for the block (STEP 224).

If MinDiff is greater than MinDiffAccuracy, a determination is made as to whether the SumNormalizedActivities is greater than NumberOfBlocksInFrame, the number of blocks in the frame (STEP 228). If not, Dmax is set to D (STEP 232), otherwise Dmin is set to 0 (STEP 236). A new value for D is then determined by averaging Dmin and Dmax (STEP 240). The values of C and m are calculated using equations (14) and (15) above (STEP 244). SumNormalizedActivities and i are then set to 0 (STEP 248).

An iterative process then follows, in which the current value of i is compared to the number of blocks in the frame (STEP 252). If the value of i is less than the number of blocks in the frame, the normalized activity for block i ($N_i$) is calculated using equation (3b) (STEP 256) and added to the previous value of SumNormalizedAct (STEP 260). The counter i is increased by one (STEP 264) and the process repeats until i is equal to the number of blocks in the frame. Once that condition is met, the absolute difference between SumNormalizedActivities and the number of blocks in the frame is calculated (STEP 268). A check is then done to determine if that difference is less than the value of MinDiff (STEP 272). If it is, MinDiff is set to Diff, and the current value for D is used as the BestD, and the process repeats from STEP 208. If it is not, the process repeats from STEP 208 without updating MinDiff and BestD. In each case, the process iterates until MinDiffAccuracy is less than the MinDiff value and D, C, and m can be calculated.

Figure 3:
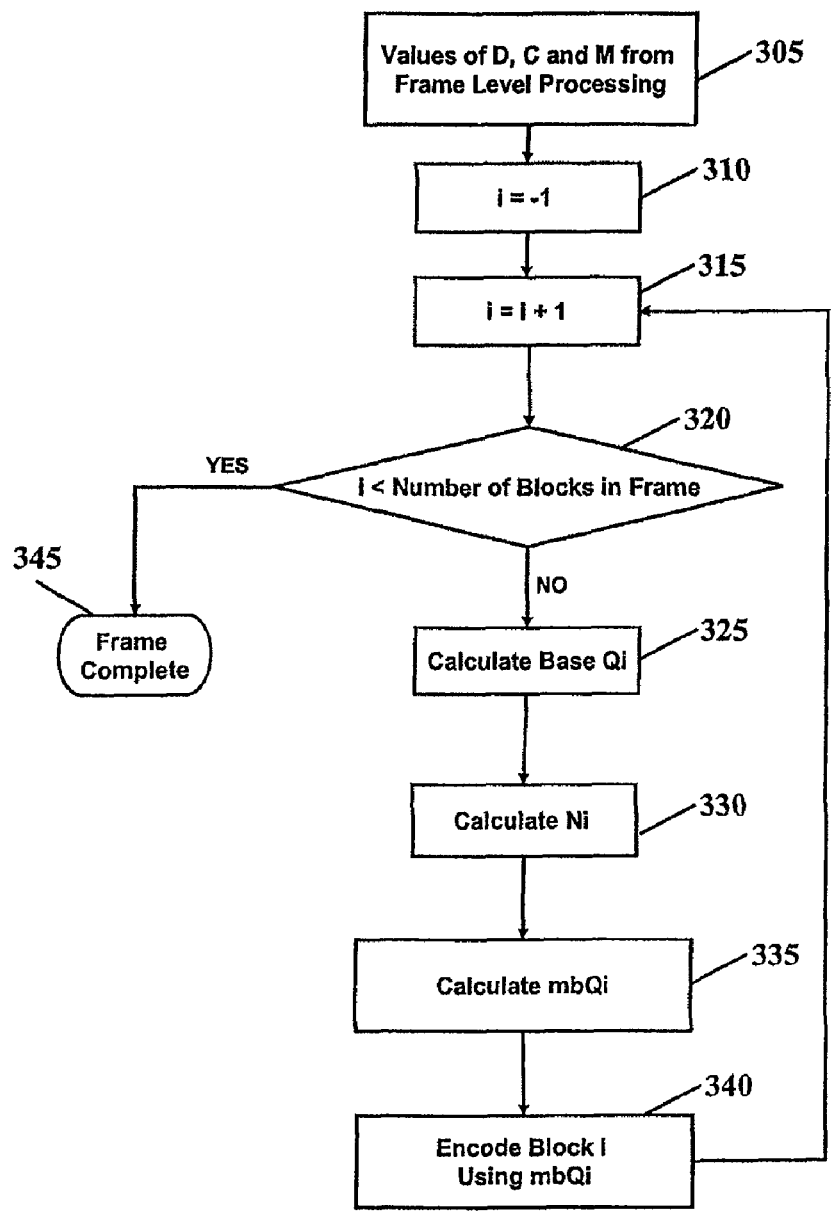
FIG. 3 is a flow chart depicting the steps for calculating a quantization value for a block within a frame in accordance with various embodiments of the invention.

Referring to FIG. 3, and having calculated values for D, C, and m (STEP 305), the activity metric N and quantization value Q for the entire frame can be calculated. The counter i, again representing the number of blocks in the frame is initialized to −1 (STEP 310). The counter is incremented by 1 (STEP 315) and compared to the number of blocks in the frame (STEP 320). If additional blocks remain to be processed, the base quantization ($Q_i$) is calculated (STEP 325) (using TM5 or other methods, all of which relates to the bits buffer fullness) or assigned (if it is the same for all blocks of the frame) and the normalized activity value ($N_i$) is calculated (STEP 330) using equation (3a). The quantization for the entire block ($mbQ_i$) can then be calculated (STEP 340) by means modulation of $Q_i$ with the value of normalized activity $N_i$ using equation (1) or (2). If in STEP 320 the counter i equals the number of blocks in the frame, the process is complete for that frame (STEP 345).

If the frame processing is done in one pass, the activities of all blocks within that frame may not be available, and therefore, it is not possible to iterate to solve equation (16). In this case, the value of D can be assumed to be close to constant during a specific scene, i.e., a sequence of frames, and therefore equation (16) can be numerically solved using a binary search at a rate of one iteration per frame. For each frame, and for the appropriate value of D, AvgN is calculated according to equation (6). If AvgN<1, the value of D for the next frame is decreased, if AvgN>1, the value of D for the next frame is increased (because, as stated above, normalized activity is a monotonic, non-increasing function of D), if AvgN=1 (within a defined accuracy threshold) the value of D for the next frame does not require any change. If several iterations are possible on the same frame then convergence to the value of D can be achieved within the iterations for the frame, however the advantage of a single pass is that it reduces resource requirements and computational complexity.

Figure 4:
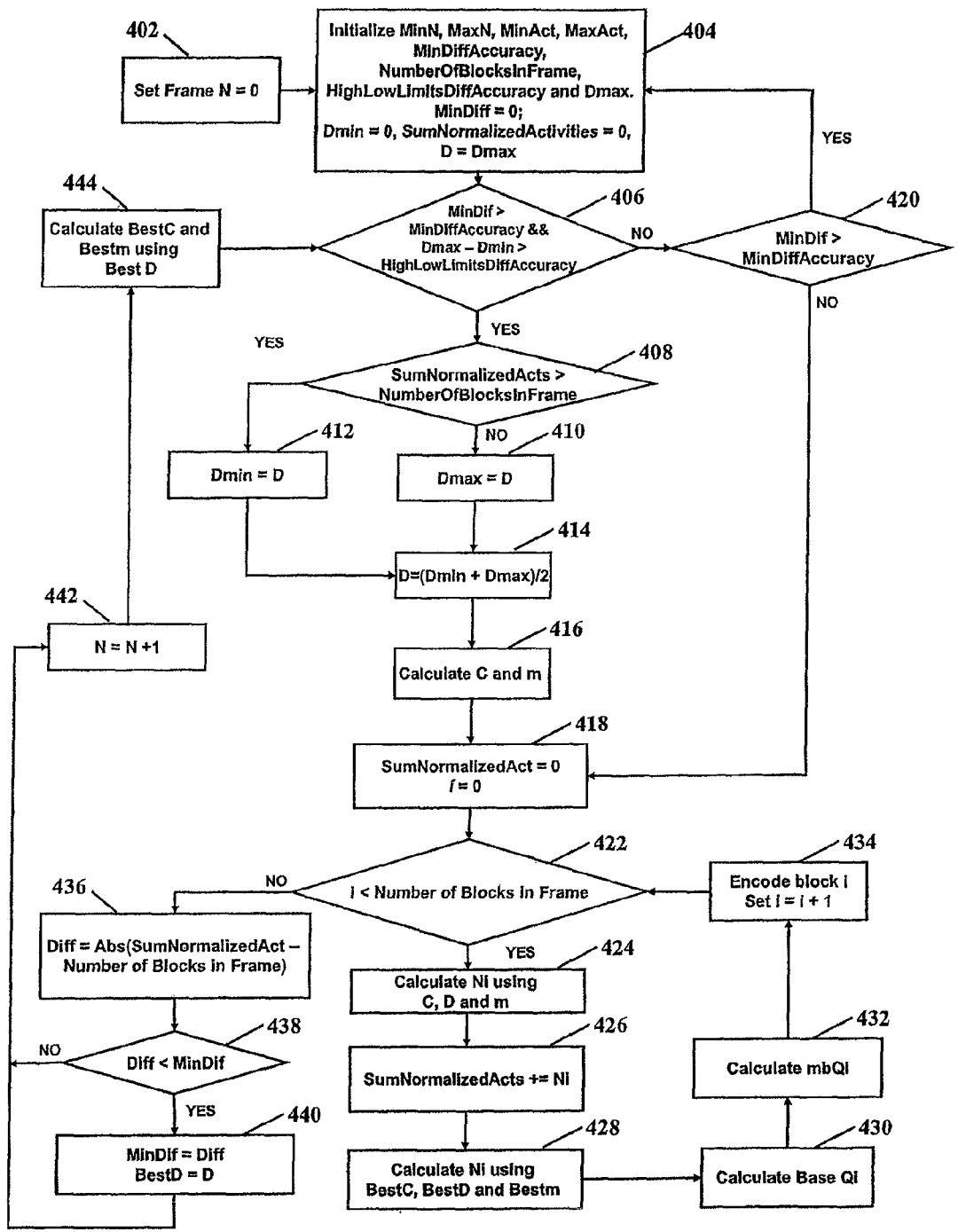
FIG. 4 is a flow chart depicting the steps for calculating a normalized activity value and quantization value for a block using multiple frames in accordance with various embodiments of the invention.

Specifically, the method for performing the steps described above with respect to multi-frame convergence is illustrated in FIG. 4. Initially, the frame number N is set to 0 (STEP 402), and various parameters are initialized (STEP 404). If MinDiff is greater than MinDiffAccuracy and the difference between Dmax and Dmin is greater than a predetermined accuracy limit, (STEP 406), a determination is made as to whether the SumNormalizedActivities is greater than i, the number of blocks in the frame (STEP 408). If not, Dmax is set to D (STEP 410), otherwise Dmin is set to D (STEP 412). A new value for D is then determined by averaging Dmin and Dmax (STEP 414). Using the value of D, C and m are calculated using equations (14) and (15) above (STEP 416). SumNormalizedActivities and i are then set to 0 (STEP 418).

If, however, STEP 406 returns a negative result but MinDiff is greater than MinDiffAccuracy (STEP 420), the process returns to STEP 404 and the values are reinitialized. If STEP 406 returns a negative result but MinDiff for the block is not greater than MinDiffAccuracy, the process continues at STEP 418 with the initialization of SumNormalizedAct and the counter i.

An iterative process then follows, in which the current value of i is compared to the number of blocks in the frame (STEP 422). If the value of i is less than the number of blocks in the frame, the normalized activity for block i ($N_i$) is calculated using equation (3a) and the current values of C, D and m (STEP 424) and added to the previous value of $N_i$ (STEP 426). The normalized activity for block i ($N_i$) is calculated again using equation (3a) with the values of C, D and m set to BestC, BestD, and Bestm respectively (STEP 428). Using the normalized activity for block i ($N_i$), the base quantizer ($Q_i$) for block i is calculated (STEP 430) and the actual quantizer for block i (mquant) for the block is calculated (STEP 432) according to equation (1). The block can then be encoded (STEP 434) using mquant and i incremented by 1 until i is equal to the number of blocks in the frame.

Once that condition is met, the absolute difference between SumNormalizedActivities and the number of blocks in the frame is calculated (STEP 436). A check is then done to determine if that difference is less than the value of MinDiff (STEP 438). If it is, MinDiff is set to Diff, and the current value for D is used as the BestD (STEP 440), the frame number N is incremented (STEP 442) and BestC and Bestm are calculated using BestD (STEP 444). The process then repeats from STEP 406. If the result of STEP 438 is false, the process continues at STEP 442 without updating MinDiff and BestD.

The choice of MinN and MaxN depends on the activity metric. Using the TM5 approach, for example, the activity metric is calculated as the variance within block i:

$$act_i = \left( \sum_{j=0}^{63} p_i^2 - \frac{\left( \sum_{j=0}^{63} p_i \right)^2}{64} \right) / 64 \qquad (18)$$

and the constants MinN and MaxN are 0.5 and 2 correspondingly. However, these values of MinN and MaxN are particular for this activity metric and if another activity metric is used, these values of MinN and MaxN may be suboptimal with respect to HVS point of view. For any activity metric (including variance) subjective and objective experiments can be carried out to determine MinN and MaxN. The invention removes these limitations by allowing the constants to change within a frame in such a way that the normalized activity is optimized with respect to HVS. As noted above, the values of MinN and MaxN are a result of experiments, some subjective (a picture pleasing to the eye), and others, objective. The selection depends on the specific activity metric used, and empirically determined. The techniques of the present invention provide greater flexibility to address different activity matrices than conventional methods. Different HVS parameters may be used to test a system based on the disclosed invention, and different tests may result in different empirical values for MinN and MaxN.

Thus, the invention allows the use of activity metrics different than what would be suggested by using the TM5 approach. For example, the activity metric may be defined as the minimum value of the difference between the maximum and minimum pixel values within each block such as an 8×8 pixel block, or within a group of blocks such as four blocks comprising a 16×16 pixel macroblock. The advantage of using this approach is that it avoids complex variance calculations such as equation (18) above.

For example, using the disclosed method it may be determined that the MinN and MaxN values that provide the desired HVS quality values are 0.5 and 3, respectively. This may be achieved by conducting experiments in which various values are tested until a defined HVS quality test is satisfied. As a result, different activity metrics can be used, possibly more suitable to a certain situation, or alternatively simpler or more efficient to implement in certain cases and the like. Hence, for a given level of quality, as determined by HVS, it is possible to use an activity metric that would provide implementation advantages such as cost, complexity, and so on.

In some embodiments, the methods and techniques of the present invention described herein may be implemented in hardware or software, or a combination of both on a general-purpose computer. In such an embodiment, the program may be written in any one of a number of high-level languages, such as FORTRAN, PASCAL, C, C++, C#, Java, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

The methods described above may also be implemented using one or more application specific integrated circuits (ASIC), programmable logic devices (PLD) field programmable gate arrays (FPGA), controlled by a program or programs in electrically erasable programmable read-only memories (EEPROM), programmable read-only memories (PROM), read-only memory devices (ROM), or dynamic random access memory (DRAM) which has been loaded with the appropriate instructions according to the embodiments described above. In some embodiments, the apparatus may be implemented using one or more microprocessors such as the Pentium family or chips manufactured by Intel Corporation of Santa Clara, Calif. or the PowerPC family of chips manufactured by Motorola Corporation of Schaumburg, Ill. In other embodiments, the apparatus may be implemented in the form of silicon modules as part of an integrated "System on a Chip" (SOC).

The invention may be embodied in other specific forms without departing form the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method for calculating a quantization value used during encoding of a video sequence, the method comprising the steps of:
   a) providing a predetermined activity metric for a portion of the video sequence;
   b) determining a minimum normalized activity value and a maximum normalized activity value for the portion of the video sequence;
   c) calculating, on one or more microprocessors, a set of normalization activity parameters based at least in part on the minimum normalized activity value and the maximum normalized activity value;
   d) determining, on the one or more microprocessors, a normalized activity value as a function of the set of normalization parameters;
   e) determining, on the one or more microprocessors, a quantization value based at least in part on the normalized activity value; and
   f) encoding, on the one or more microprocessors, the portion of the video sequence using the quantization value.

2. The method of claim 1 wherein the portion of the video sequence comprises a frame of the video sequence.

3. The method of claim 1 wherein the minimum normalized activity value is greater than 0 and less than 1.

4. The method of claim 1 wherein the maximum normalized activity value is greater than 1.

5. The method of claim 1 wherein the determination of the normalization activity parameters assures that the average normalized activity value is equal to 1 for the portion of the video sequence regardless of the predetermined activity metric.

6. The method of claim 1 wherein the set of normalization activity parameters comprises a first parameter C, a second parameter D, and third parameter m, and the function for determining the normalized activity value for the portion of the video sequence comprises adding C to the predetermined activity metric for the portion, and dividing the result by the sum of D and the product of m and the predetermined activity metric.

7. A method for encoding a video sequence, the method comprising the steps of:
   selecting a method of assessment of video quality based on a human visualization system;
   calculating, on one or more microprocessors, a normalized activity value that optimizes the encoding of the video sequence according to the chosen method of assessment;
   calculating, on the one or more microprocessors, a quantization step size based on the normalized activity metric; and
   encoding, on the one or more microprocessors, the video sequence using the quantization step size.

8. The method of claim 7 further comprising calculating, on the one or more microprocessors, the normalized activity value for each block within a frame of the video sequence.

9. The method of claim 8 wherein the normalized activity value calculated for each block is based on a predetermined activity metric.

10. A non-transitory computer-readable medium encoded with a program for calculating a quantization value used during the encoding of a video sequence, that, when executed by at least one microprocessor, performs a method comprising:
    a) providing a predetermined activity metric for a portion of the video sequence;
    b) determining a minimum normalized activity value and a maximum normalized activity value for each portion of the video sequence;
    c) determining a set of normalization activity parameters based at least in part on the minimum normalized activity value and the maximum normalized activity value;
    d) determining a normalized activity value as a function of the set of normalization parameters; and
    e) determining a quantization step size based at least in part on the normalized activity value; and
    f) encoding each portion of the video sequence using the quantization step size.

11. An apparatus for encoding video data, comprising:
    at least one microprocessor configured to
    select an activity metric;
    select a method of assessment of encoded video quality based on a human visualization system;
    select an optimal minimum normalized activity value and optimal maximum normalized activity value based on the selected activity metric and the human visualization system;
    calculate a set of normalization activity parameters;

calculate a normalized activity value to be used for encoding the video data based on the activity value and the normalization activity parameters;
calculate a quantization value based on the normalized activity value; and
encode the video data using the quantization value.

12. The apparatus of claim 11 wherein the at least one microprocessor is further configured to calculate the normalized activity value for each block within a frame of the video sequence.

13. The apparatus of claim 11 wherein the at least one microprocessor is further configured to calculate the normalized activity value for each block based on the selected activity metric and the calculated set of normalization activity parameters.

14. An apparatus for determining a quantization value used during encoding of a video sequence, comprising:
at least one microprocessor configured to
provide a predetermined activity metric for a portion of the video sequence;
determine a minimum normalized activity value and a maximum normalized activity value for the predetermined activity metric;
determine a set of normalization activity parameters;
determine a normalized activity value as a function of the set of normalization parameters and the predetermined activity metric;
determine a quantization step size based at least in part on the normalized activity value; and
encode the portion of the video sequence using the quantization step size.

15. The apparatus of claim 14 wherein the portion of the video sequence comprises a frame of the video sequence.

16. The method of claim 14 wherein the minimum normalized activity value is greater than 0 and less than 1.

17. The method of claim 14 maximum normalized activity metric is greater than 1.

18. The method of claim 14 wherein the determination of the normalization activity parameters assures that the average normalized activity value is equal to 1 for the a number of portions of the video sequence regardless of the predetermined activity metric.

19. The method of claim 14 wherein the set of normalization activity parameters comprises a first parameter C, a second parameter D, and third parameter m, and the function for determining the normalized activity value for the portion of the video sequence comprises adding C to the predetermined activity value for the portion, and dividing the result by the sum of D and the product of m and the predetermined activity value.

* * * * *